United States Patent [19]
Crary et al.

[11] Patent Number: 5,642,497
[45] Date of Patent: Jun. 24, 1997

[54] DIGITAL DISK RECORDER USING A PORT CLOCK HAVING PARALLEL TRACKS ALONG A TIMELINE WITH EACH TRACK REPRESENTING AN INDEPENDENTLY ACCESSIBLE MEDIA STREAM

[75] Inventors: Errol C. Crary, Beaverton; Richard W. Stallkamp, Tigard; Laurence J. Morandi; Douglas C. Stevens, both of Portland; Alexandru Mitaru, Beaverton, all of Oreg.

[73] Assignee: Tektronix, Inc., Wilsonville, Oreg.

[21] Appl. No.: 380,273

[22] Filed: Jan. 30, 1995

[51] Int. Cl.$^6$ ........................................... G06F 13/00
[52] U.S. Cl. ...................... 395/500; 395/555; 395/821; 341/126
[58] Field of Search .................................. 395/650, 550, 395/154, 500; 341/126

[56] References Cited

U.S. PATENT DOCUMENTS

| | | | |
|---|---|---|---|
| 4,893,256 | 1/1990 | Rutherfoord et al. | 364/518 |
| 5,333,299 | 7/1994 | Koval et al. | 395/550 |
| 5,367,621 | 11/1994 | Cohen et al. | 395/154 |
| 5,388,264 | 2/1995 | Tobias, II et al. | 395/650 |
| 5,420,801 | 5/1995 | Dockter et al. | 364/514 |
| 5,452,435 | 9/1995 | Malouf et al. | 395/550 |
| 5,490,272 | 2/1996 | Mathis et al. | 395/650 |

FOREIGN PATENT DOCUMENTS

| | | | |
|---|---|---|---|
| 0522645 | 7/1992 | European Pat. Off. | G06F 15/403 |
| 0550197 | 12/1992 | European Pat. Off. | G06F 9/46 |
| 0598499 | 10/1993 | European Pat. Off. | G06F 9/46 |
| 9400270 | 1/1994 | WIPO | G06F 3/033 |
| 9400079 | 1/1994 | WIPO | G06F 15/403 |
| 9403550 | 3/1994 | WIPO | G06F 9/44 |

OTHER PUBLICATIONS

Lamont, L., "Synchronization Architecture and Protocols for a Multimedia News Service Application", IEEE, pp 3–8. 1994.
Vina, A., "Real–Time Multimedia Systems," IEEE, pp 77–83. 1994.
Woo, Miae, "A Synchronization Framework for Communication of PRe–orchestrated Multimedia Information," IEEE, pp 52–61. 1994.
Wang, Chang–Hia, "A Multimedia Synchronization Protocol for ATM Networks," IEEE, pp 476–483 1994.
Hao, Ying, "Media Synchronization in ATM Network–based Distributed Multimedia Systems," IEEE, pp 468–475. 1994.
Ravindran, K., "Delay Compensation Protocols for synchronization of Multimedia Data Streams," IEEE, pp 574–589. Aug. 1993.
Ishibashi, Yutaka, "A Synchronization Mechanism for Continous Media in Multimedia Communications," IEEE, pp 1010–1019. 1995.

*Primary Examiner*—Thomas C. Lee
*Assistant Examiner*—Duo Chen
*Attorney, Agent, or Firm*—Francis I. Gray

[57] ABSTRACT

An application programming interface for a digital disk recorder uses a port to link resources together to form a multimedia recorder that emulates a tape recorder while retaining the flexibility of the digital disk recorder. The port is a matrix of timelines for each resource, with each track in the port representing a media stream associated with a different one of the resources. A dynamic subsystem controls recording and playing back multimedia between the resources and a disk file system of the digital disk recorder using the port. A static subsystem maintains on the disk file system a database of movies recorded by the digital disk recorder from the resources according to the port, with each movie being a collection of media files for each resource that are independently accessible.

2 Claims, 2 Drawing Sheets

DIGITAL DISK RECORDER USING A PORT CLOCK HAVING PARALLEL TRACKS ALONG A TIMELINE WITH EACH TRACK REPRESENTING AN INDEPENDENTLY ACCESSIBLE MEDIA STREAM

BACKGROUND OF THE INVENTION

The present invention relates to accessing and manipulating digital data files, and more particularly to an application programming interface for a digital disk recorder for accessing and manipulating multiple tracks of media files.

In a tape recorder different media streams, representing video, audio, time code and switching events, are bound together by the physical nature of the medium. Each stream is represented on the tape medium as a parallel track that runs nominally along the length of the tape. However in a video disk recorder each media stream/track is recorded on its own, independent file on the disk. This breaks the physical binding of the tape model, and makes editing, slipping tracks and replacing tracks easier. However to provide familiarity and ease of use it is desirable to emulate a tape recorder for operator efficiency.

SUMMARY OF THE INVENTION

Accordingly the present invention provides an application programming interface for a digital disk recorder that uses a port to link resources together to form a multimedia recorder that emulates a tape recorder while retaining the flexibility of the digital disk recorder. The port is a matrix of timelines for each resource. A movie is attached to each resource along that resources timeline. The movie is in the form of a collection of media files. The port is then activated to record/playback multimedia as in the tape recorder. The movies are maintained as a database on the digital disk recorder.

The objects, advantages and other novel features of the present invention are apparent from the following detailed description when read in conjunction with the appended claims and attached drawing.

DESCRIPTION OF THE PREFERRED EMBODIMENT

Figure 1:
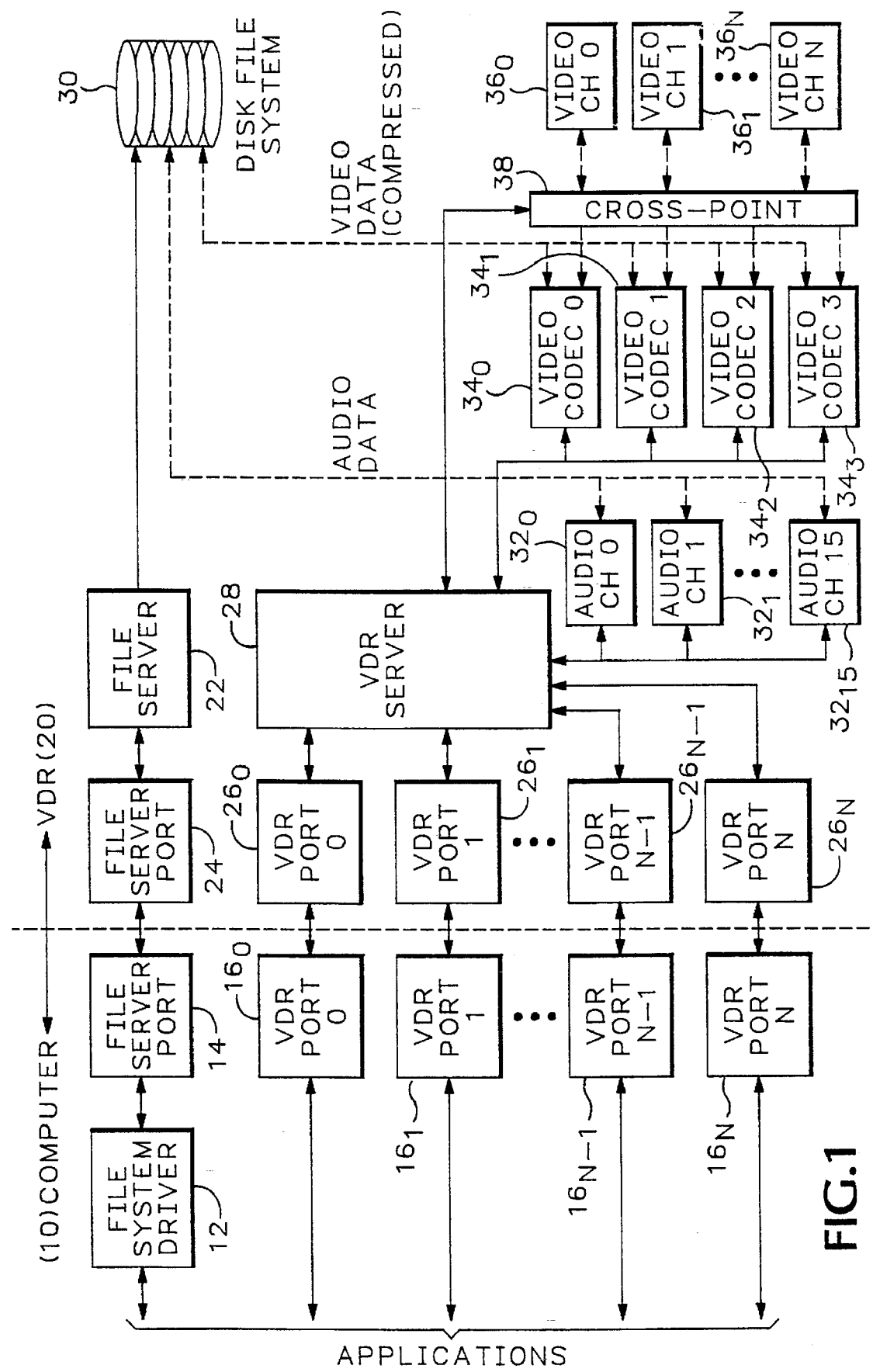
FIG. 1 is a block diagram view of the application programming interface according to the present invention.

Referring now to FIG. 1 an application programming interface is shown. An operator interfaces with a computer 10 which runs applications for a video disk recorder (VDR) 20. The computer 10 includes a file system driver 12 and a portion of a file server port 14, as well as a portion of a number of VDR ports 16o–16n. In the VDR 20 are corresponding portions of the file server port 24 and the VDR ports 26o–26n. The file sewer port 24 is coupled to a file server 22 which in turn is coupled to a disk file system 30. The VDR ports 26 are all coupled to a VDR server 28, which in turn is coupled to a plurality of audio channels 32-0 through 32-15 and a plurality of video codecs 34-0 through 34-3 for one particular configuration. Data is transferred between the disk file system 30 and the audio channels 32 and the video codecs 34. The video codecs 34 are coupled to a plurality of video channels 36o–36n via a crosspoint matrix 38.

In operation audio data from the audio channels 32 is transferred to/from the disk file system 30 under control of the VDR server 28, and compressed video data from the video codecs 34 is transferred to/from the disk file. The video data is input to and output from the video codecs 34 in broadband format, i.e., uncompressed. The crosspoint matrix 38 under command from the VDR server 28 couples each video codec 34 to a particular one of the video channels 36. The file server 22 provides access to the disk file system 30 to determine where the data is to be written into or read from. The VDR server 28 determines for any particular write or read operation the source/destination from among the audio channels 32 and the video codecs 34. The file server 22 and the VDR server 28 communicate with the computer 10 via their respective port pairs 14/24, 16/26.

There are three libraries that are used to interface programs to the VDR 20: a Vdr library, a VdrConfig library and a Pdr library. The software model presented by the libraries is of two intersecting subsystems: a dynamic subsystem that records and plays multimedia, i.e., a set of media streams, and a static subsystem that maintains a database of movies, i.e., sets of relationships between recorded media. The "objects" of the Vdr subsystem have Handles, and the "objects" of the Pdr subsystem have Tokens.

Every application of the computer 10 that uses the VDR 20 begins by establishing a relationship with the system. The center of that relationship is a Port Clock, also known as the Port. The Port links together a set of Physical Resources into a multimedia recorder. The recorder operates on one or more streams of media, such as video, audio, timecode and events, and records those streams to media files or plays back existing media files into those media streams. The recorder's Port's Resources are linked together and all active Resources are all doing the same function, i.e., recording media files, playing existing media files or idle. Different active Resources attached to a single Port may not be doing different things. All inactive Resources are considered to be idle.

Physical Resources are the inputs and outputs 32/36 of the VDR 20 and the codecs 34 which interface the media streams to the media files on the disks 30. Some Resources may be shared among ports and applications, while other Resources must be temporarily owned by the Port and application that are using them. In general input Resources may be shared, i.e., several Ports may use the same video input without conflict. Instead of allocating the input Resource, the application gets a connection Handle that is used in the same manner as an allocated Handle. The codecs 34 and output Resources need to be allocated to that Port, and the application has ownership so no other application may cause a conflict in their use.

Media files have an addressable resolution of one field of video, which is more than a single sample of audio. The media file addresses are all positive, starting at 0. However all of the fields of a media file need not be recorded. A media file must be attached to a codec Resource in order to be used with a media stream. The media file is delimited with "IN/OUT" points to be used. The IN point is that field position in the media file which is to be used first by the codec Resource, while the OUT point is the first field position beyond the last field that is not to be used by the codec Resource. The IN/OUT points are relative to the media file. An "attach" function automatically sets the IN/OUT points to default values, i.e., IN=0 and OUT=N, where the highest number recorded field in the media file is N−1.

For a new media file the default OUT point is 0 and the file is empty. Until the IN/OUT points for the attached media file are set, the files are not used, i.e., it is merely a place-holder on a timeline with length of 0. This means that the OUT point of a new media file must be set in order to record into the file. The file appears on the timeline to be the length specified by the OUT point. The media file that is attached to a codec Resource has a "position" on the timeline. The position is the relationship between the field numbers on the timeline and the field numbers in the media file. For the first media file attached to a codec Resource the IN position is 0 on the timeline.

In the static subsystem the first object of the database is the movie. The movie is a collection of media files that are used together to create a multimedia activity. The movie is a static image of the media files, and the files need to be moved to the dynamic subsystem of codecs and ports to be used. Movies have names and are collected into groups, which also are named. The names are merely ways of identifying the movies. The movie database is global, accessible to all Ports.

The movie has logical tracks, each track having a type and a number. The track types are a subset of the Physical Resources and represent the codecs to which the media files are attached. There is no representation of the input and output Resources of the Port. The use of logical Resources in the movie allows the movie to be recorded on one Port, and played correctly on a different configuration as long as the configuration has a similar number and type of codecs.

The movie may be used on a Port with either more or fewer Resources than the Port on which it was recorded, or for which it was edited. It is the application's responsibility to determine how to map the logical tracks to Physical Resources.

To control access to the media files the database provides an indirect reference to the files by using MediaTokens. A media token represents the media file and also contains IN/OUT points to be used for this instance of the media file usage. The use of the indirect reference means that all usages of the media file may be identified and counted, and that the media file is not inadvertently deleted while it is being used elsewhere. To allow detection of media file usage an application should not use those parts of the Vdr library that give direct access to the file. Those parts are generally identified as Vdr functions that require a file path name, or a movie name, or functions that support those functions.

An application program has three basic sections: two set-up sections where the Resources are acquired and the media files attached, and an action section where record and/or playback occurs. The following is a short example for recording a movie:

```
//include the necessary header files.
#include <windows.h>
#include "vdrport.h"
#include "pdrmovie.h"
//define some convenient values so magic numbers are not used.
#define MOVIENAME "test1"
#define GROUPNAME "testgroup"
#define DATA_SET NULL
#define INPUT_NUM 0
#define OUTPUT_NUM 0
#define CODEC_NUM 0
#define LOG_TRACK_NUM 0
#define MOVIE_LEN 18000
#define BEFORE_HANDLE NULL
#define REC_SHUTTLE_RATE (float)1.0
main( )
{
    //declare the variable to be used; Handles, Tokens, etc.
    VdrHandle port;
    ResourceHandle videoIn, videoOut, videoCodec
    MediaHandle mediaHandle
    MovieToken movie
    ResourceToken track
    MediaToken mediaToken
    //set-up phase 1; open a port and configure it.
    port = VdrOpenPort( )
    videoIn = VdrGetResourceConnectionHandle(port, Resource VideoIn, INPUT_NUM);
    videoOut = VdrAllocateResource(port, ResourceVideoOut, OUTPUT_NUM);
    videoCodec = VdrAllocateResource(port, ResourceVideoCodec, CODEC_NUM);
    (void)VdrDefaultEvent(port, NULL, EventConnect Resources, videoIn, videoOut);
    (void)VdrDefaultEvent(port, NULL, EventConnectResources, videoIn, videoCodec);
    //set-up phase 2.
    movie = PdrCreateMovie(MOVIENAME, GROUPNAME)
    track = PdrCreatResourceToken(VideoTrack, LOG_TRACK_NUM);
    mediaToken = PdrCreateMediaToken(DATA_SET, movie, track, MOVIE_LEN, PdrNullMediaToken( ));
    mediaHandle = PdrAttachMedia(mediaToken, videoCodec, BEFORE_HANDLE, ShiftAfter);
    //now start the actions.
```

```
        (void)VdrCueRecord(port);
        (void)VdrShuttle(port, REC_SHUTTLE_RATE);
        while(MOVIE_LEN != VdrGetPosition(port))
                Sleep(30);
        (void)VdrIdle(port);
        return 0;
}
```

Each library has its own header file, and since both Vdr and Pdr libraries are used, those header files are included. The windows.h header file is included because it, for this example, is the computer operating system, and every program needs it. The define statements are used so that the code has fewer magic numbers and strings, and function parameters are more meaningful. The DATA_SET being NULL is the default for using the internal disks of the disk file system. If expansion disks are available, other values of DATA_SET may be used to force the media file to reside on the expansion disk set. The values of INPUT_NUM, OUTPUT_NUM and CODEC_NUM are the number of the Physical Resource of that particular type to be used. Using 0 is only automatically valid for the CODEC_NUM, while for the other two resources it presumes that the first video input and output connectors are being used, which may not be valid. The value of LOG_TRACK_NUM is the logical track of type VideoTrack to which the MediaToken is attached. Generally the logical tracks are used in sequential order starting at 0. The value of MOVIE_LEN is used to determine the OUT point on the media file, and thus the point at which the recording stops—18000 fields is approximately 5 minutes for NTSC video. The value of BEFORE_HANDLE is a special case to cause the attach to append the media file, and since for this example this is the only media file, there are no other files before which to insert this file. The REC_SHUTTLE_RATE is the rate at which the Port Clock advances during record. The rate is a floating point number, and 1.0 means the rate is the same as the vertical synch rate of the incoming video.

During the first set-up phase the port is opened, and the Resources are acquired and linked to the port. The Vdr library looks for an available port, so the application does not need to specify a particular port to be opened. There are two methods for getting a ResourceHandle—the Allocation method provides an exclusive use of the Resource while the Connection method provides shared access to the Resource. Input resources may be shared, so the videoIn Handle is acquired by getting a Connection Handle. The codec and the output need to have exclusive access, so they are allocated. Next two Events are listed, where an event is a happening relative to the Port state and Clock position. The making of connections is an event. The event functions may have different numbers of arguments depending upon the event, i.e., a ConnectResources event has only the input and the output resource handles while a MixAudio event has two additional parameters, the target level of the input in the output as a percentage and the number of fields over which to spread the change from the current level to the target level. The Event functions cause particular connections to be made based on the state of the port. If the port is in Idle or Record state, the videoIn is connected to both the videoCodec and the videoOutput so that the input media stream may be recorded and monitored simultaneously.

Having acquired the configuration for the port, the next step is to attach the media files. First a movie is created with two pieces of information: its name and the name of the group into which it is to be placed. The movie name must be unique within the group, but may duplicate names in other groups. A group is an arbitrary division of the name space in a manner that is helpful to the application and/or user. Each group could identify a project, a user, etc. A group comes into being the first time a movie is placed into it, and is deleted when the last movie in the group is deleted.

Next to create an empty media file for attachment to the codec a logical track into which the MediaToken is to be placed is identified. That logical track is encapsulated in the ResourceToken: it consists of the TrackType (VideoTrack) and the logical number of the track within the specified type (LOG_TRACK_NUM). For example there may be up to 32 logical tracks of each type. However for the present example with only four codecs there is no value in having more tracks in a movie. The MediaToken is created relative to the movie and logical track onto which it is to be placed. The MediaToken contains the IN/OUT points to be used with this reference to the media file, and the actual path name for the media file. The file is referenced indirectly by using the MediaToken.

The function for creating the MediaToken has as its first parameter a data set name. Where expansion disks are available, they may be treated as separate data sets. This parameter allows placement of the media file on the desired data set. A null value for this parameter indicates that the file is to be created on the internal disk set. The movie length is another parameter for creating the MediaToken. This length is the initial value for the OUT point in the file, and becomes the file length since there is no interactive way to start and stop recording. There are a couple of approaches to recording interactive programs that are being told when to start and stop recording. One approach is to place the OUT point far out in the timeline position to ensure it is beyond the end of all recording that will be done. Then when the state is changed to Idle, the OUT point is reset to a value within the recorded material. The second approach is to start with an OUT point that is slightly further out on the timeline than the IN point, then as the record starts to approach the OUT point, move the OUT point forward another increment. No disk space is used for fields that are not recorded, as the OUT point is a control on the resource driver and not on the file system.

The last parameter for creating the MediaToken is a token already on this same logical track of the movie. It indicates where the MediaToken is to be attached: if it is not NULL, the new MediaToken is attached before the reference Media-Token. In this example the token is NULL—the value NULL is returned by the function PdrNullMediaToken0. Because the type of a MediaToken is not a redefinition of a basic compiler type, a NULL MediaToken cannot be represented by a compilable NULL. Thus the MediaToken class supplies a NULL value. When the new MediaToken is to placed at the end of the logical track after all existing MediaTokens on the track, or when the logical track is empty, the final parameter for creating the MediaToken is NULL, as shown.

Having created an indirect reference to the media file, it may be attached to the dynamic timeline of the port. This is the final step in this phase of the set-up. The function has a parameter to indicate the relative position of this media: the before MediaHandle causes an insert if it references a media that is already on the codec's timeline. If the timeline is empty, or if the new media is to be appended at the end of all existing media, this parameter is NULL. The shift type indicates how the media on the timeline changes relative to the point at which this media is being added.

Figure 2:
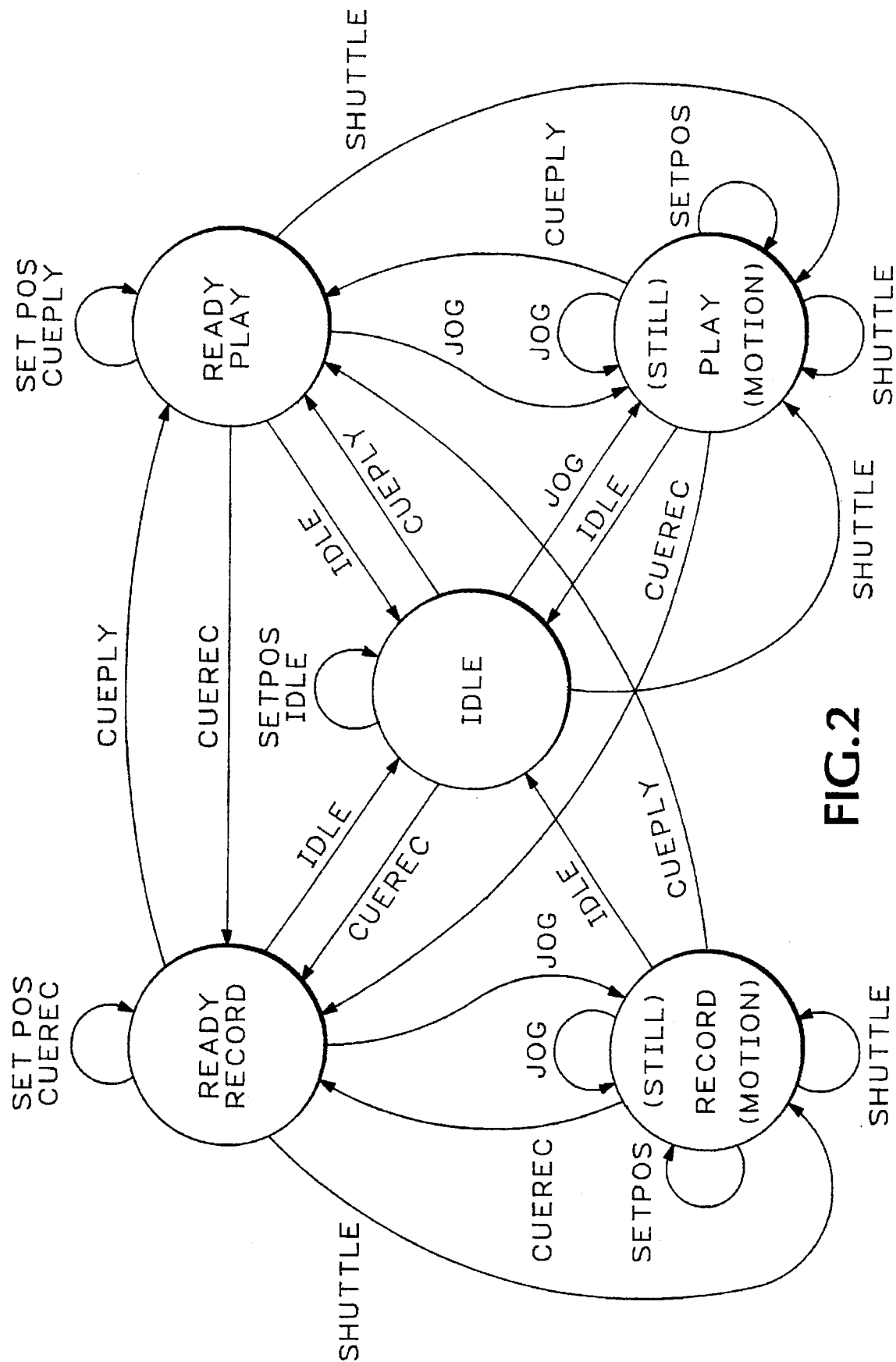
FIG. 2 is a state diagram view for the VDR server of the application programming interface according to the present invention.

Once there are media files into which to record, the VDR 20 is ready for video cassette recorder (VCR) type commands, as shown in FIG. 2. The first command switches the state of the port to Record mode from Idle. This causes a lot of action within the VDR as the resource drivers learn that they need to Set ready. All of the activity is completed within a few milliseconds, and the VDR is ready to record. The record command may be issued immediately without waiting for the state change of the VDR, and it starts as soon as it can. If it is desired to control the start of the record, it is possible to give a CueRecord command early and then wait for a trigger condition before starting to record. Recording starts with the first field (field 1) of a frame pair after the command is issued if the CueRecord state is achieved. The recording is actually accomplished by placing the PortClock in shuttle mode. In shuttle mode the clock advances its position each time the input media has a vertical sync. The amount the position is advanced is the shuttle rate: for recording the position should advance one for one with the incoming fields and so the value 1.0 is used. Once the recording is started, the while loop in the code is used to know when to switch the port back to Idle state without interactive input. The program gets the current position of the PortClock and compares that position to the OUT point of the media. If the clock has not arrived at that position, the program reduces its use of resources by doing a Sleep function call. Once the OUT point has been reached by the clock, the while loop fails, and the port's state is changed to Idle.

In this next example the movie recorded above is played. The code is a separate program, and so many of the steps of the Record program are repeated.

```
//include the necessary header files.
#include <windows.h>
#include "vdrport.h"
#include "pdrmovie.h"
//define some convenient values so magic numbers are not used.
#define MOVIENAME "test1"
#define GROUPNAME "testgroup"
#define INPUT_NUM 0
#define OUTPUT_NUM 0
#define CODEC_NUM 0
#define LOG_TRACK_NUM 0
#define BEFORE_HANDLE NULL
#define PLAY_SHUTTLE_RATE (float)1.0
main( )
{
    //declare the variables to be used: Handles, Tokens, etc.
    VdrHandle port;
    ResourceHandle videoIn, videoOut, videoCodec;
    MediaHandle mediaHandle;
    EventHandle playConnection;
    MovieToken movie;
    ResourceToken track;
    MediaToken mediaToken;
    int eventTime;
    int stopTime;
    //setup phase1: open a port and configure it.
    port = VdrOpenPort( )
    videoIn = VdrGetResourceConnectionHandle(port,
ResourceVideoIn,
                    INPUT_NUM);
    videoOut = VdrAllocateResource(port, ResourceVideoOut,
OUTPUT_NUM);
    videoCodec = VdrAllocate Resource(port, ResourceVideoCodec,
CODEC_NUM);
    (void)VdrDefaultEvent(port, NULL, EventConnectResources,
                videoIn, videoOut);
    //set-up phase 2.
    movie = PdrGetMovieTokenFromName(MOVIENAME,
GROUPNAME);
    track = PdrCreateResourceToken(VideoTrack, LOG_TRACK_NUM);
    mediaToken = PdrGetNextMediaToken(movie, track,
PdrNullMeidaToken( ));
    mediaHandle = PdrAttachMedia(mediaToken, videoCodec,
BEFORE_HANDLE,
                    ShiftAfter);
    eventTime = VdrGetMediaStartPosition(mediaHandle);
    playConnection = VdrScheduleEvent(port,
    eventTime,EventConnectResources,
                    videoCodec, videoOut);
    stopTime = VdrGetMediaMarkOut(mediaHandle)
            -VdrGetMediaMarkIn(mediaHandle) + eventTime;
    //now start the actions
    (void)VdrSetPosition(port, eventTime);
    (void)VdrCuePlay(port);
    (void)VdrShuttle(port, PLAY_SHUTTLE_RATE);
```

```
        while (stopTime != VdrGetPosition(port))
              Sleep(30);
        (void)VdrIdle(port);
        return 0;
}
```

A couple of the define statements used in the Record program are not needed in the Play program: The DATA_SET define is only needed to create new media files; the REC_SHUTTLE_RATE is changed to PLAY_SHUTTLE_RATE; and the MOVIE_LEN define is removed because a different method is used for getting the ending value.

In phase 1 set-up the biggest change is in the state events. Since the Play program does not use the port's record state, there is no effort used in setting the record connection. Also the play connection event is moved forward into phase 2 set-up. The Play program does not need the videoIn resource, and could technically not bother to acquire the resource or make an event to connect the resource to the videoOut resource. However it is nice to have some output during Idle state, and the videoIn resource is shared, so it is not keeping other applications from using it.

Most of the differences in programming between the Record program and the Play program occur in phase 2 set-up. Instead of creating a new movie, the program asks for the token of the movie the Record program created. Instead of creating a new MediaToken, the Play program gets the media token that was created by the Record program. An assumption is made that the program knows exactly the way the movie is constructed. It knows there is a VideoTrack logical number 0, and it knows that there is only one MediaToken on the track.

The function PdrGetNextMediaToken is used to enumerate the media tokens on a track of a movie. The third parameter to the function is a known MediaToken on the track being examined, or a NULL MediaToken. If the parameter is not NULL, then the MediaToken following the referenced token is returned. This return is a NULL Media-Token if the reference MediaToken is the last one on the track. If the third parameter is a NULL MediaToken, then the first MediaToken on the track is returned.

After again attaching the indirectly referenced media file to the codec resource, statements are added to get the start and end clock positions for playing the media file. In the first statement the library returns the position of the media file on the timeline. The end of the media play time is calculated a few statements later. This is the time at which a switch of state to Idle is needed. Although assumptions could be made about both of these values based on the record program, new techniques are used to show other capabilities of the system. The function VdrGetMediaStartPosition returns the clock position corresponding to the IN point of the reference media file. At that point, or before, an event is scheduled to switch the resource connection so that the codec output is connected to the videoOut resource. The events for play state are scheduled events. The event does not necessarily happen at the change of port state, but may be scheduled for any point on the port timeline. The event then repeatably happens each time the same arrangement is played. The scheduled event has one parameter different from the state triggered events caused by the VdrDefaultEvent function: instead of a NULL, the scheduled event has a position on the timeline at which it should happen. The reason the event function is moved from phase 1 to phase 2 set-up is to wait until the position of the media file on the timeline is known before scheduling the event. Because there is only one media file, the position may be predicted to be 0, but there is a better way to get the correct position. Because the movie length is known, the test for switching from Play state to Idle state could be assumed, but if the IN/OUT points are changed another technique is required. The code determines the final position of the port clock by getting the IN/OUT points and adding their difference to the position of the media.

The first action in the action section is the equivalent of a Rewind statement that takes no time; it occurs instantaneously. The port clock position is set to the same point that the media is attached to the timeline, and the play event is scheduled to make the connection between the codec and the videoOut resource. This action is not necessary in this particular case because the program has just attached the media file, and the current position may be assumed to be 0, just as the IN point is assumed to be 0. The second statement changes the port's state from Idle to Play, causing the resource drivers to get ready, i.e., they start buffering the media files so that they have their media data available when it is needed. The actual play is caused in the same manner as the record: the port clock is told to start running and given the rate at which it should advance by the VdrShuttle function. The wide loop shows the use of the calculated end point instead of the assumed end point based on the length of the recorded file. Then when the end point is reached, the program changes the port state back to Idle.

Rather than specify resources based upon assumptions, resource acquisitions may be handled as follows. For example since codecs are generic and any of the codecs may be substituted for any other, the program searches for an available codec.

```
#include "vdrConf.h"
...
ResourceHandle videoCodec = 0;
int i = 0, limit;
...
limit = PciGetNumCodecs(VideoCodec);
while (i<limit && videoCodec == 0)
{      videoCodec = VdrAllocateResource(port,
ResourceVideoCodec, i);
       i++;
}
if (videoCodec == 0)
{  //now process the error of no video codec available.
}
```

By adding a couple of new variables to control a loop through the codecs and adding a call to the Pci function to set the limit of the loop, the code is improved. The vdrConf library allows more independence between code and hardware configuration by allowing symbolic names to be used for the input and output resources. The only requirement is that, if someone changes the connections to the VDR, the resource names need to be changed to match.

The resources may be assigned symbolic names as follow:

```
...
#define IN_NAME "feed1"
#define OUT_NAME "monitor3"
#define MAX_NAME 10
...
ResourceHandle videoIn = 0, videoOut = 0
int i = 0, limit;
char name[MAX_NAME];
...
limit = PciGetNumInputs(VideoInput);
while (i<limit && videoIn == 0)
{       if (PciGetInputName(VideoInput, i, name, MAX_NAME) &&
        (strcmp(name, IN_NAME) == 0))
        {       videoIn = VdrGetResourceConnectionHandle(port,
                                ResourceVideoIn, i)
        }
        i++;
}
i = 0;
limit = PciGetNumOutputs(VideoOutput);
while (i<limit && videoOut == 0)
{       if (PciGetOutputName(VideoOutput, i, name, MAX_NAME) &&
        (strcmp(name,OUT_NAME) == 0)
        {       videoOut = VdrAllocateResource(port,
ResourceVideoOut, i);
        }
        i++;
}
if (videoIn == 0 || videoOut == 0)
{       //process the error; couldn't get the resource.
}
```

This fragment assumes that vdrConf. h is still included. It defines a few new constats and variables, and is similar to the code for getting the codec with the addition of a name comparison. The "if" statement first trys to act the ith name from the library and, if it is able to act the name, it compares the name to the desired name string as given in the define statement. At the end there is a test to make certain the resources are available, and could include the test for the codec as well.

Thus the present invention provides an application programming interface for a digital disk recorder by using a port to link resources together to form a multimedia recorder, by attaching a movie in the form of a collection of media files to the port, and by activating the port to record/playback multimedia.

What is claimed is:

1. An application programming interface for a digital disk recorder comprising:

a dynamic subsystem for recording and playing back multimedia between resources and a disk file system of the digital disk recorder, the dynamic subsystem having a port clock for linking the resources together, the port clock having a plurality of parallel tracks along a timeline, each track representing a media stream and being associated with a different one of the resources and each media stream representing at least one media file;

a static subsystem for maintaining on the disk file system of the digital disk recorder a database of movies recorded by the multimedia recorder from the resources according to the port clock, each movie being a collection of media files for each resource that are independently accessible.

2. A method of application programming a digital disk recorder comprising the steps of:

opening a port clock, the port clock being in the form of a plurality of parallel tracks along a timeline, each track representing a different media stream of at least one media file;

coupling a plurality of resources to the port clock, each resource being coupled to a different one of the tracks to provide the media stream for that track;

attaching a movie to the port clock, the movie being in the form of a collection of media files for each resource and being stored in a disk file system of the digital disk recorder; and activating the port clock to record/play the movie.

* * * * *